No. 668,077. Patented Feb. 12, 1901.
R. B. ALLISON.
JACK SCREW.
(Application filed Jan. 24, 1900.)
(No Model.)
Fig. 2. Fig. 1.
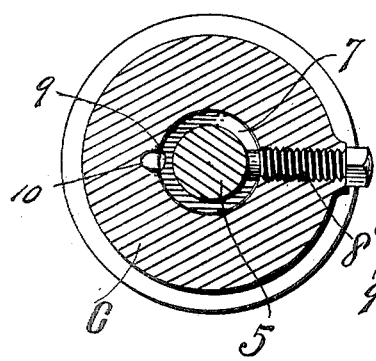
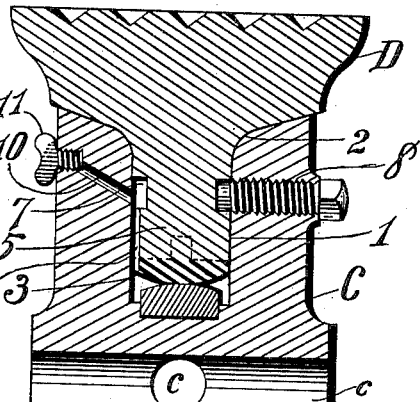
Fig. 3.
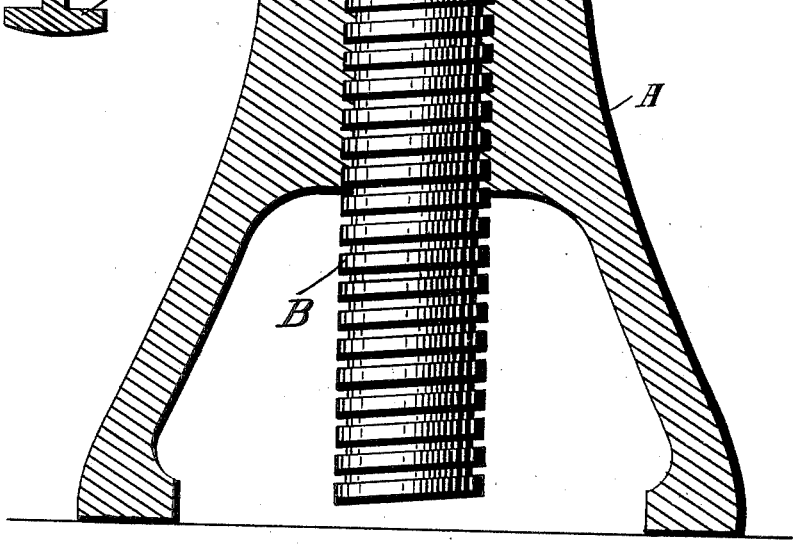
WITNESSES
C. W. Hart.
Ralph S. Warfield.
INVENTOR
Robert B. Allison.
per Rhesa G. Du Bois & Co.
his Attorneys.
THE NORRIS PETERS CO., PHOTO-LITHO., WASHINGTON, D. C.

UNITED STATES PATENT OFFICE.

ROBERT B. ALLISON, OF BURLINGAME, KANSAS.

JACK-SCREW.

SPECIFICATION forming part of Letters Patent No. 668,077, dated February 12, 1901.

Application filed January 24, 1900. Serial No. 2,643. (No model.)

*To all whom it may concern:*

Be it known that I, ROBERT B. ALLISON, a citizen of the United States of America, residing at Burlingame, in the county of Osage and State of Kansas, have invented new and useful Improvements in Jack-Screws, of which the following is a specification.

My invention relates to an improvement in jack-screws, the object being to provide a lifting-jack which shall be as nearly frictionless as possible and at the same time possess adequate strength to make it universal in application to various kinds of work to which a jack of this character is applicable.

With the foregoing object in view the invention consists in the main of a standard, a screw, a head on the screw bored out centrally and vertically and having a hardened bearing in the bottom of the bore, and a cap having a shank fitted to the bore, the lower end of said shank having a hardened bearing-surface and means for retaining the cap in position, preventing lateral play, and for lubricating the moving parts.

My invention still further consists in certain novel features of construction and combination of parts, which will be hereinafter described, and pointed out in the claims.

In the accompanying drawings, Figure 1 is a vertical sectional view. Fig. 2 is a horizontal section, and Fig. 3 is a detail.

A represents the base or standard, and B is the screw, the same having heavy threads of slight pitch which turn in corresponding threads in the standard or base to give the screw slow movement and great power. On the upper end of the screw a head C is formed, and this head is provided with sockets $c$ $c$, preferably four in number, arranged radially and at right angles to one another to receive the operating handle bar or lever. (Not shown.) This head C is bored out vertically through its center for a suitable depth, as at 1, and the upper end of the head from the bore outward is rounded off, as at 2, for a purpose which will be hereinafter explained. In the bottom of the bore 1 a bearing 3, of steel or other hardened metal, is seated, it being preferably sunk below the surface of the bottom a short distance, as indicated. This bearing is preferably convex on its upper surface, although it might be part or wholly flat.

D indicates the cap of the screw-jack. It has a rough or serrated upper surface where it engages the object to be lifted, and it is provided on its lower surface with a depending cylindrical shank 5, which fits the bore of the head C, in which it turns freely with a minimum of friction. From this shank to the outer surface of the cap the latter is rounded to correspond with and fit the rounded shoulder 2 of the head C. The shank 5 of the cap is preferably rounded and convex on its extreme lower end, and this portion may be hardened to prevent wear, or it may be provided with a removable bearing 6, which when worn can be replaced. When convex, this bearing-surface touches the bearing 3 at a point merely, so that friction is reduced to a minimum, and is in the axial line of the weight applied upon the upper surface of the cap, so that the bearing-contact is in direct line of the weight and power applied and friction thereby reduced to a minimum. Of course if the upper surface of the bearing 3 is flat or partly flat it is my purpose to correspondingly form the bearing 6.

About midway the length of the shank 5 a circumferential groove 7 is formed, and a screw 8, extending through the head, projects into said groove and holds the cap in place in the bore of the head. A channel 9 in the side of the shank extends from the groove 7 to the lower end of the shank for supplying lubricant to the bearings 3 and 6. A duct 10 extends diagonally through the head from a point preferably above the circumferential groove 7 and discharges into the latter, and a screw-plug 11 is provided for closing said duct. In this duct 10 the oil is fed. By its location and connection with the circumferential groove 7 in the shank said groove serves not only the function previously ascribed to it of receiving the end of the screw 8, but also it acts as an oil-reservoir, which in conjunction with the duct 10, the groove 9, and the spaces between the bearings 3 and 6 affords an oil-receptacle of large capacity, so that the jack only requires oiling at this point at very long intervals. Enough oil works up between the shoulder 2 and the cap so that friction at that point is greatly reduced, and at the same time oil does not flow in excess, so as to escape at the upper end of the shoulder. The screw 11 closes the duct 10 and not only prevents loss of lubricant at that point, but also the ingress of dust, grit, or extraneous matter.

The jack thus constructed is simple, composed of few parts, easy to manufacture, and is powerful in leverage and general efficiency, and above all the friction of its various moving parts is reduced to a minimum.

It is evident that slight changes might be resorted to in the form and arrangement of the several parts described without departing from the spirit and scope of my invention. Hence I do not wish to limit myself to the precise construction herein set forth; but, Having fully described my invention, what I claim as new, and desire to secure by Letters Patent, is—

1. The combination with a base or standard and a screw having a head thereon, said head having lever-sockets therein intersecting each other at right angles over the axial center of the screw, the head provided with a vertically and axially located socket, of a cap having a stem fitted to this socket and provided with an annular groove, rounded bearings at the point of contact between the bottom of said socket and the lower end of the stem, and a screw turned into a threaded hole in the head and fitted at its inner end to the annular groove in the stem.

2. The combination with a base or standard, and a screw, the head of which has an upwardly-extending axially-located socket, of a head having a stem fitted to this socket, said head having an annular groove formed therein, and provided with a rounded lower end and a groove which extends from the annular groove to the space between this rounded end of the shank and the bottom of the socket, and the head provided with an inclined duct which leads from a point on the surface of the head at a higher level than the annular groove and adapted to supply lubricant to the annular and vertical grooves in the stem of the head and to the space at the lower end of the stem and increase the capacity of said parts to hold lubricant.

In testimony whereof I have signed my name to this specification in the presence of two subscribing witnesses.

ROBERT B. ALLISON.

Witnesses:
J. M. CHAMBERS,
J. MAYBERRY.